(12) United States Patent
Hepner et al.

(10) Patent No.: US 10,618,850 B2
(45) Date of Patent: Apr. 14, 2020

(54) METHODS OF EXTRACTING INORGANIC NUTRIENTS FROM PRETREATED BIOMASS TO FORM A FERTILIZER COMPOSITION, AND RELATED SYSTEMS

(71) Applicant: POET Research, Inc., Sioux Falls, SD (US)

(72) Inventors: Tad Scott Hepner, Sioux Falls, SD (US); W. Wade Robey, Sioux Falls, SD (US); Steven G. Redford, Brandon, SD (US); Adam R. Wirt, Lennox, SD (US)

(73) Assignee: POET Research, Inc., Sioux Falls, SD (US)

( * ) Notice: Subject to any disclaimer, the term of this patent is extended or adjusted under 35 U.S.C. 154(b) by 76 days.

(21) Appl. No.: 15/293,446

(22) Filed: Oct. 14, 2016

(65) Prior Publication Data

US 2017/0107159 A1    Apr. 20, 2017

Related U.S. Application Data

(60) Provisional application No. 62/242,076, filed on Oct. 15, 2015.

(51) Int. Cl.
*C05D 9/00* (2006.01)
*C05F 17/00* (2020.01)
(Continued)

(52) U.S. Cl.
CPC ................ *C05D 9/00* (2013.01); *C05B 17/00* (2013.01); *C05C 11/00* (2013.01); *C05D 1/00* (2013.01);
(Continued)

(58) Field of Classification Search
CPC ... C05D 9/00; C05D 1/00; C05D 5/00; C05D 3/00; C05B 17/00; C05C 11/00;
(Continued)

(56) References Cited

U.S. PATENT DOCUMENTS

| 396,274 A | 1/1889 | Endemann |
| 3,186,825 A | 6/1965 | Price |

(Continued)

FOREIGN PATENT DOCUMENTS

| WO | 2008/060137 A1 | 5/2008 |
| WO | 2010/002886 A1 | 1/2010 |

(Continued)

OTHER PUBLICATIONS

Grohmann, Karel, and Rodney J. Bothast. "Saccharification of corn fibre by combined treatment with dilute sulphuric acid and enzymes." Process Biochemistry 32.5 (1997): 405-415.*

(Continued)

*Primary Examiner* — Jennifer A Smith
(74) *Attorney, Agent, or Firm* — Kagan Binder, PLLC (57) ABSTRACT

The present disclosure includes methods of making a fertilizer composition from pretreated biomass by removing one or more inorganic nutrients from a fermentation beer to form an aqueous fertilizer composition. The present disclosure also includes systems configured to make a fertilizer composition from pretreated biomass, where the systems include one or more apparatuses in fluid communication with a fermentation vessel, wherein at least one apparatus is configured to remove one or more inorganic nutrients from the fermentation beer to form an aqueous fertilizer composition.

14 Claims, 6 Drawing Sheets

(51) Int. Cl.
*C05F 17/02* (2006.01)
*C05B 17/00* (2006.01)
*C05C 11/00* (2006.01)
*C05D 1/00* (2006.01)
*C05D 3/00* (2006.01)
*C05D 5/00* (2006.01)
*C05F 5/00* (2006.01)

(52) U.S. Cl.
CPC .............. *C05D 3/00* (2013.01); *C05D 5/00* (2013.01); *C05F 5/008* (2013.01); *C05F 17/00* (2013.01); *C05F 17/0258* (2013.01); *Y02A 40/212* (2018.01); *Y02W 30/43* (2015.05)

(58) Field of Classification Search
CPC ...... C05F 17/0258; C05F 17/00; C05F 5/008; Y02A 40/212; Y02W 30/43
See application file for complete search history.

(56) References Cited

U.S. PATENT DOCUMENTS

| | | | |
|---|---|---|---|
| 3,509,924 A | 5/1970 | Marinus, Jr. | |
| 5,171,592 A | 12/1992 | Holtzapple et al. | |
| 5,250,182 A * | 10/1993 | Bento | B01D 61/58 |
| | | | 210/259 |
| 5,424,417 A | 6/1995 | Torget et al. | |
| 5,503,996 A | 4/1996 | Torget et al. | |
| 6,022,419 A | 2/2000 | Torget et al. | |
| 6,245,121 B1 | 6/2001 | Lamy et al. | |
| 7,301,060 B2 | 11/2007 | Appel et al. | |
| 7,585,652 B2 | 9/2009 | Foody et al. | |
| 7,842,484 B2 | 11/2010 | Lewis | |
| 8,008,517 B2 * | 8/2011 | Cantrell | B01D 3/004 |
| | | | 554/8 |
| 8,063,258 B2 | 11/2011 | Bartek et al. | |
| 8,168,840 B2 | 5/2012 | Brady et al. | |
| 8,236,173 B2 | 8/2012 | Bartek et al. | |
| 8,425,766 B2 | 4/2013 | Bartek et al. | |
| 8,450,094 B1 | 5/2013 | Narendranath et al. | |
| 8,609,874 B2 * | 12/2013 | Woods | C11B 13/00 |
| | | | 210/770 |
| 8,685,685 B2 | 4/2014 | Retsina et al. | |
| 9,034,620 B2 | 5/2015 | Narendranath | |
| 9,068,206 B1 | 6/2015 | Kwiatkowski et al. | |
| 9,278,379 B2 | 3/2016 | Carlson et al. | |
| 9,469,859 B1 | 10/2016 | Bly et al. | |
| 9,663,807 B2 | 5/2017 | Narendranath et al. | |
| 1,202,312 A1 | 2/2019 | Foody et al. | |
| 2006/0188965 A1 | 8/2006 | Wyman et al. | |
| 2007/0199894 A1 * | 8/2007 | Peyton | C02F 3/28 |
| | | | 210/603 |
| 2009/0286295 A1 | 11/2009 | Medoff et al. | |
| 2010/0056833 A1 | 3/2010 | Suarez et al. | |
| 2010/0233771 A1 | 9/2010 | McDonald et al. | |
| 2011/0023565 A1 | 2/2011 | Yanik et al. | |
| 2011/0113843 A1 * | 5/2011 | Mantelatto | C05F 5/00 |
| | | | 71/23 |
| 2011/0143013 A1 * | 6/2011 | Lawton, Jr. | C07K 14/425 |
| | | | 426/656 |
| 2011/0306808 A1 | 12/2011 | Appel et al. | |
| 2012/0034667 A1 * | 2/2012 | Kiuchi | C10L 1/026 |
| | | | 435/161 |
| 2012/0144730 A1 | 6/2012 | Stamires et al. | |
| 2013/0065289 A1 | 3/2013 | Carlson | |
| 2013/0158308 A1 | 6/2013 | Powell | |
| 2013/0164795 A1 * | 6/2013 | Lowe | C12P 7/16 |
| | | | 435/134 |
| 2013/0309738 A1 * | 11/2013 | Barr | C12P 7/16 |
| | | | 435/160 |
| 2014/0024826 A1 | 1/2014 | Narendranath et al. | |
| 2014/0209092 A1 | 7/2014 | McDonald et al. | |
| 2014/0248676 A1 * | 9/2014 | Griffin | D21C 11/0007 |
| | | | 435/165 |
| 2015/0128932 A1 | 5/2015 | Kwiatkowski et al. | |
| 2015/0305370 A1 * | 10/2015 | Bleyer | A23K 10/38 |
| | | | 435/71.2 |
| 2016/0121236 A1 | 5/2016 | Carlson et al. | |

FOREIGN PATENT DOCUMENTS

| | | |
|---|---|---|
| WO | 2010/111396 A1 | 9/2010 |
| WO | 2012/103281 A2 | 8/2012 |
| WO | 2013/109153 A1 | 7/2013 |
| WO | 2013/133703 A1 | 9/2013 |
| WO | 2014/071498 A1 | 5/2014 |

OTHER PUBLICATIONS

Wilkie, Ann C., Kelly J. Riedesel, and John M. Owens. "Stillage characterization and anaerobic treatment of ethanol stillage from conventional and cellulosic feedstocks." Biomass and Bioenergy 19.2 (2000): 63-102.*

Wang, Hui, et al. "Effect of the corn breaking method on oil distribution between stillage phases of dry-grind corn ethanol production." Journal of agricultural and food chemistry 56.21 (2008): 9975-9980.*

Rasmussen, Mary. "Enhancing dry-grind corn ethanol production with fungal cultivation and ozonation." (2009).*

* cited by examiner

METHODS OF EXTRACTING INORGANIC NUTRIENTS FROM PRETREATED BIOMASS TO FORM A FERTILIZER COMPOSITION, AND RELATED SYSTEMS

RELATED APPLICATION

The present non-provisional patent application claims the benefit of commonly owned provisional Applications having Ser. No. 62/242,076, filed on Oct. 15, 2015, which provisional Application is incorporated herein by reference in its entirety.

FIELD

The present disclosure is related to methods and/or systems for making a fertilizer composition from pretreated biomass. More particularly, the present disclosure is related to methods and/or systems for removing one or more inorganic nutrients from a fermentation beer to form an aqueous fertilizer composition. Fermentation beer can be provided from a wide variety of biomass such as that used in corn grain ethanol processes and/or corn stover ethanol processes.

BACKGROUND

Biomass can be used to make one or more biochemical such as ethanol, butanol, and the like. Biomass can be pretreated to provide monosaccharides, which can be converted to one or more biochemicals by an organism such as yeast via fermentation.

Recovering and using residual components from the pretreated biomass can be economically desirable. There is a continuing need to efficiently recover residual components from pretreated biomass such as pretreated biomass used in an ethanol biorefinery.

SUMMARY

Embodiments of the present disclosure include a method of making a fertilizer composition from pretreated biomass, the method including:
   fermenting the pretreated biomass to provide a fermentation beer, wherein the fermentation beer includes a solid component and an aqueous liquid component; and
   removing one or more inorganic nutrients from the fermentation beer to form an aqueous fertilizer composition.

Embodiments of the present disclosure also include a system configured to make a fertilizer composition from pretreated biomass, the system including:
   a fermentation vessel configured to ferment the pretreated biomass to provide a fermentation beer, wherein the fermentation beer includes a solid component and an aqueous liquid component; and
   one or more apparatuses in fluid communication with the fermentation vessel, wherein each vessel is configured to remove one or more inorganic nutrients from the fermentation beer to form an aqueous fertilizer composition.

DETAILED DESCRIPTION

Embodiments of the present disclosure include methods and systems for making a fertilizer composition by recovering one or more endogenous inorganic elements that have been released or extracted from biomass feedstock. Exemplary endogenous inorganic elements present in biomass feedstock include "plant positive nutrients." As used herein, "plant positive nutrients" means macronutrients and micronutrients beneficial to plant growth. For example, plant positive nutrients can help a plant's ability to metabolize, transport nutrients, store water, and the like. Exemplary macronutrients include one or more of nitrogen, phosphorus, potassium, sulfur, calcium, and magnesium. Exemplary micronutrients include one or more of molybdenum, chlorine, iron, boron, manganese, zinc, copper, and nickel. The endogenous inorganic elements may be recovered in elemental form and/or in the form of an inorganic compound (e.g., oxides) so as to form a fertilizer composition. Such endogenous inorganic elements and/or inorganic compounds can function as nutrients in a fertilizer composition for use with plants in agriculture. As used herein, "inorganic nutrients" includes inorganic elements, inorganic compounds, and combinations thereof. Advantageously, recovering inorganic nutrients to form a fertilizer composition can reduce or eliminate having to remediate (e.g., via anaerobic digestion and/or waste-water treatment) waste streams that include the inorganic nutrients. In addition, solids used in anaerobic digestion can have a higher purity because the inorganic nutrients can be extracted prior to the anaerobic digester. Furthermore, recovering inorganic nutrients from biomass for use in agriculture can offset fertilizer compositions derived from petroleum sources.

Endogenous inorganic elements can be released or extracted from biomass feedstock due to one or more treatments including thermal treatment (e.g., heating, steam explosion, and the like), mechanical treatment (e.g., grinding, pressing, filtering, and the like), chemical treatment (e.g., acid hydrolysis), biological treatment (e.g., enzymatic saccharification, fermentation, and the like), and combinations thereof. In some embodiments, endogenous inorganic elements can be extracted from biomass feedstock due to processing of biomass to convert sugars into one or more biochemicals via fermentation. Acid used in hydrolysis pretreatments and/or solvent (e.g., water) can help dissolve the inorganic elements and compounds into a liquid (e.g., water). Mechanical action can help press the mobilized inorganic elements out of the solid biomass structure and into a liquid phase.

A variety of biomass treatments for releasing or extracting inorganic elements can vary depending on the biomass and/or any upstream processing (e.g., biomass pretreatment (e.g., grinding, soaking, hydrolysis, and the like), fermentation, and/or distillation). In some embodiments, endogenous inorganic elements can be released from biomass feedstock in corn grain ethanol processing. In other embodiments, endogenous inorganic elements can be released from biomass feedstock in corn stover ethanol processing.

In one embodiment, the present disclosure includes a method of making a fertilizer composition from pretreated biomass.

Exemplary biomass feedstock includes grains (e.g., corn, sorghum, barley, wheat, rye, rice, millet), switchgrass, wood chips, and agricultural residue (e.g., corn cobs and corn stover (i.e., corn stalks and leaves)).

As used herein, a "pretreated biomass" means biomass feedstock that has been subjected to one or more treatments so as to convert polysaccharides and oligosaccharides into monosaccharides (e.g., via hydrolysis) that are available to an organism such as yeast for fermentation. Exemplary pretreatment protocols can include one or more processes such as grinding, acid hydrolysis, enzymatic hydrolysis, steam explosion, and the like. Further, pretreatment protocols can depend on the type of biomass being pretreated such as corn kernels or corn stover. Exemplary enzymatic hydrolysis (saccharification) of starch in whole ground corn is described in U.S. Pat. No. 7,842,484 (Lewis), the entirety of which patent is incorporated herein by reference.

Hydrolyzing a lignocellulosic substrate such as corn stover can provide a solid component including glucan and lignin and a liquid component including a monosaccharide such as xylose and/or glucose. In some embodiments, the solid component can be separated from the liquid component so that the liquid component can be used to form at least a portion of the processed plant material for fermentation as described herein. The liquid component can be separated from the solid component after hydrolysis via one or more of centrifugation, filtering, etc. Hydrolyzing lignocellulosic substrates such as corn stover to provide, e.g., xylose and/or glucose is well-known and is described in, e.g., U.S. Pat. No. 5,424,417 (Torget et al.); U.S. Pat. No. 6,022,419 (Torget et al.); and U.S. Pat. No. 8,450,094 (Narendranath et al.), and U.S. Publication Number 2010/0233771 (McDonald et al.), wherein the entireties of said patent documents are incorporated herein by reference for all purposes.

The pretreated biomass can be fermented to provide a fermentation beer having one or more inorganic nutrients. Fermentation beer can include a solid component and an aqueous liquid component. The solid component can include residual lignin, polysaccharides (such as starch, cellulose, hemicellulose), and the like. The aqueous liquid component can include water, one or more biochemical (e.g., ethanol), oil derived from the biomass (e.g., corn). Exemplary methods of fermentation are described in U.S. Pat. No. 7,842,484 (Lewis), wherein the entirety of said patent is incorporated herein by reference.

One or more inorganic nutrients can be removed (i.e., recovered) from the fermentation beer at any point subsequent to fermentation in downstream processing to form an aqueous fertilizer composition.

As used herein, a "fertilizer composition" means a composition recovered from a process used to convert sugars derived from biomass into one or more biochemicals via fermentation. In some embodiments, a fertilizer composition recovered from such a biochemical production process can be subsequently processed (e.g., filtered, concentrated, supplemented, enriched, and/or the like) to modify the fertilizer composition. In some embodiments, a fertilizer composition can be supplemented with additional amounts of one or more minerals so as to comply with commercial fertilizer specifications. In some embodiments, a fertilizer composition obtained from a biochemical production process can be in the form of a dry fertilizer composition. In some embodiments, a fertilizer composition obtained from a biochemical production process can be an aqueous liquid fertilizer composition that includes the one or more inorganic nutrients dissolved in water. Liquid fertilizer compositions include, e.g., starter fertilizer compositions that can be incorporated directly into a seed bed at planting. As another example, liquid fertilizer compositions can include foliar application compositions that can facilitate targeting a desired amount of nutrients at one or more times in plant maturation and growth stages. A refined, natural, plant derived liquid fertilizer composition can include many plant positive macro and micro nutrients to be used in a standalone product, a blend stock, or supply extender for current liquid fertilizer manufacturers. Advantageously, liquid fertilizer compositions can reduce waste by providing an efficient dosage of nutrients at one or more desired times instead of broadcasting a single dosage of fertilizer for the growing season.

Embodiments of the present disclosure can remove (recover) one or more inorganic nutrients from a fermentation beer after fermentation (but before distillation) and/or after distillation. Notably, polysaccharides and/or oligosaccharides can be substantially hydrolyzed to form monosaccharides. At least a portion of the monosaccharides can be consumed during fermentation and, therefore, before the one or more inorganic nutrients are recovered. Advantageously, because at least a portion of the sugars are consumed prior to recovering the one or more inorganic nutrients, a relatively more pure liquid fraction can be available to refine into a fertilizer composition. It is noted that in some embodiments there may be some residual monosaccharides present in a recovered fertilizer composition. As another advantage, because fermentation and/or distillation processes can tolerate the presence of endogenous inorganic elements (and associated inorganic compounds) the one or more inorganic nutrients can be recovered at a variety of points in the back-end of an overall process for converting sugars from biomass into one or more biochemicals via fermentation. As illustrated in the figures, one or more membrane filters and/or one or more centrifugal separators can be selected and used so as to refine one or more process streams and help isolate inorganic nutrients from, e.g., insoluble organic matter, to a desired degree and form a fertilizer composition. For example, one or more membranes having desired pore sizes and made of desired materials can be selected to remove at least a portion (e.g., substantially all) of chemical oxygen demand (COD) material (e.g., residual lignin, residual cellulose, and spent yeast cells) in a first retentate, while macronutrients, micronutrients, and one or more undesirable metals (e.g., sodium) pass through the filter as a first permeate (filtrate). Advantageously, removing insoluble organic solids can permit a fertilizer to be applied with spray equipment without clogging spray nozzles to an undue degree. Subsequently, one or more membranes having desired pore sizes and made of desired materials can be selected to filter the first permeate so that most of the macronutrients and micronutrients are retained in a second retentate to form a fertilizer composition and the undesirable metals (e.g., sodium) pass through as a second permeate. Any macronutrients (e.g., phosphorus) and/or micronutrients that pass through with a metal such as sodium can be replenished by supplementing the second retentate (fertilizer composition) with one or more sources of nitrogen, phosphorus, potassium, sulfur, calcium, and magnesium. Exemplary supplement sources include ingredients such as ash and/or phosphoric acid. Alternatively, one or more membranes having desired pore sizes and made of desired materials can be selected to remove at least a portion (e.g., substantially all) of chemical oxygen demand (COD) material in a retentate, while macronutrients, micronutrients, and one or more undesirable metals (e.g., sodium) pass through the filter as a permeate (filtrate) to form a fertilizer composition, where the sodium content can be tolerated. In some embodiments, a stillage composition (e.g., thin stillage) can be processed as described herein (with filters and/or centrifugal separators) so that substantially all insoluble organic solids can be removed (e.g., no detectable insoluble organic solids) to form a fertilizer composition. In some embodiments, such processing can occur at a pH that does not cause undue precipitation of one or more desirable inorganic compounds while at the same time is at a pH that does not impact plants to an undue degree when the fertilizer is applied. In some embodiments, such a pH can be in the range from 6.5 to 7.5, or even from 6.8 to 7.2.

Optionally, in some embodiments, at least a portion of the aqueous fertilizer composition can be heated to evaporate at least a portion of water from the aqueous fertilizer composition to form a concentrated fertilizer composition.

Optionally, a fertilizer composition recovered from the back-end of an overall process for converting sugars from biomass into one or more biochemicals via fermentation can be supplemented by adding one or more additives (e.g., additional amounts of minerals) to form a fertilizer composition within commercial agricultural specifications. For example, a fertilizer composition recovered from the back-end of an overall process for converting sugars from biomass into one or more biochemicals via fermentation can sold directly as a fertilizer or as a composition to be blended with additional nutrients or ingredients so as to form a commercial fertilizer product. In some embodiments, as mentioned above, ash can be added at one or more points in an ethanol process post-fermentation to facilitate forming a fertilizer composition. Ash can increase the content of potassium and phosphorus. A variety of sources of ash can be used. For example, ash can be obtained from a solid fuel boiler that is used to process corn stover residue from a corn stover ethanol process.

Optionally, a fertilizer composition recovered from the back-end of an overall process for converting sugars from biomass into one or more biochemicals via fermentation can include one or more inorganic salts that are exogenous to the biomass feedstock and that are produced during biochemical (e.g., ethanol) production. For example, exogenous inorganic salts can be produced by neutralizing an acid (e.g., sulfuric acid) that was added to pretreat biomass.

Figure 1:
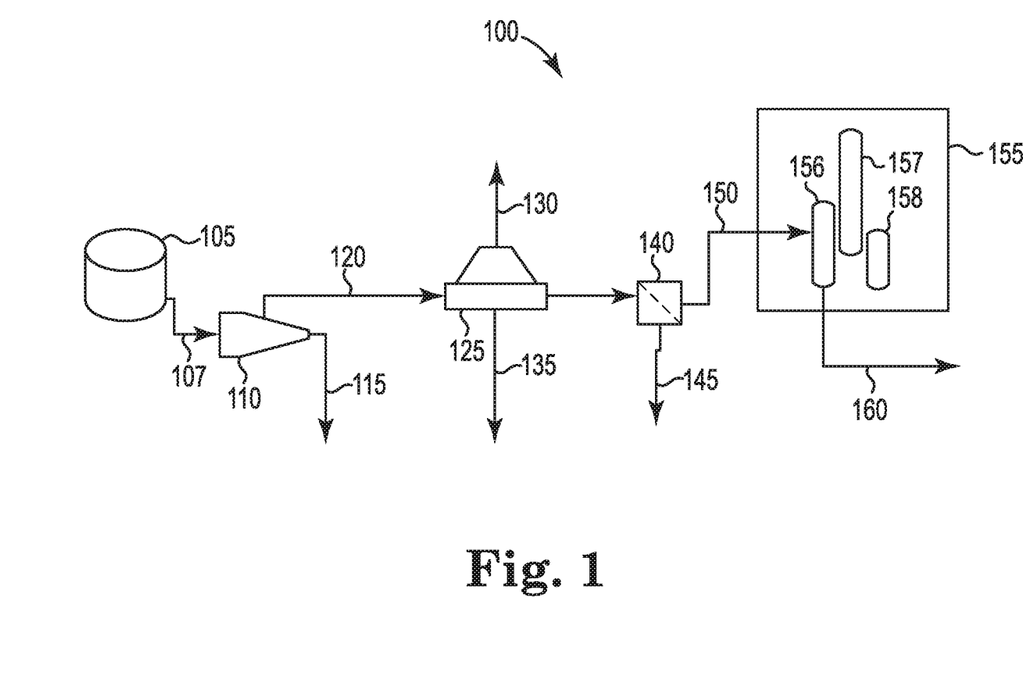
FIG. 1 is a schematic process diagram that illustrates removing one or more inorganic nutrients from a fermentation beer to form an aqueous fertilizer composition according to one embodiment of the present disclosure.
Figure 2:
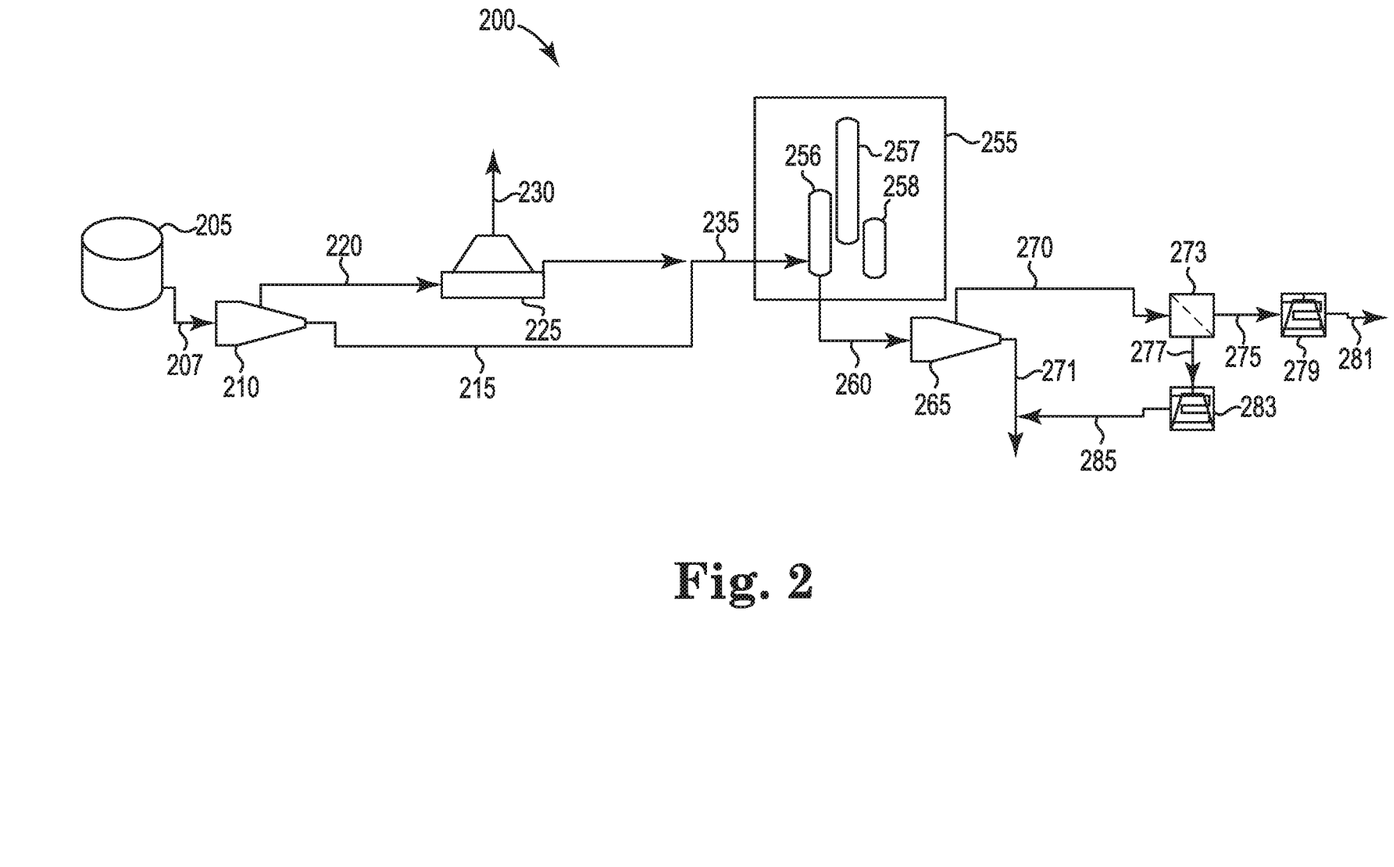
FIG. 2 is a schematic process diagram that illustrates removing one or more inorganic nutrients from a fermentation beer to form an aqueous fertilizer composition according to another embodiment of the present disclosure.
Figure 3:
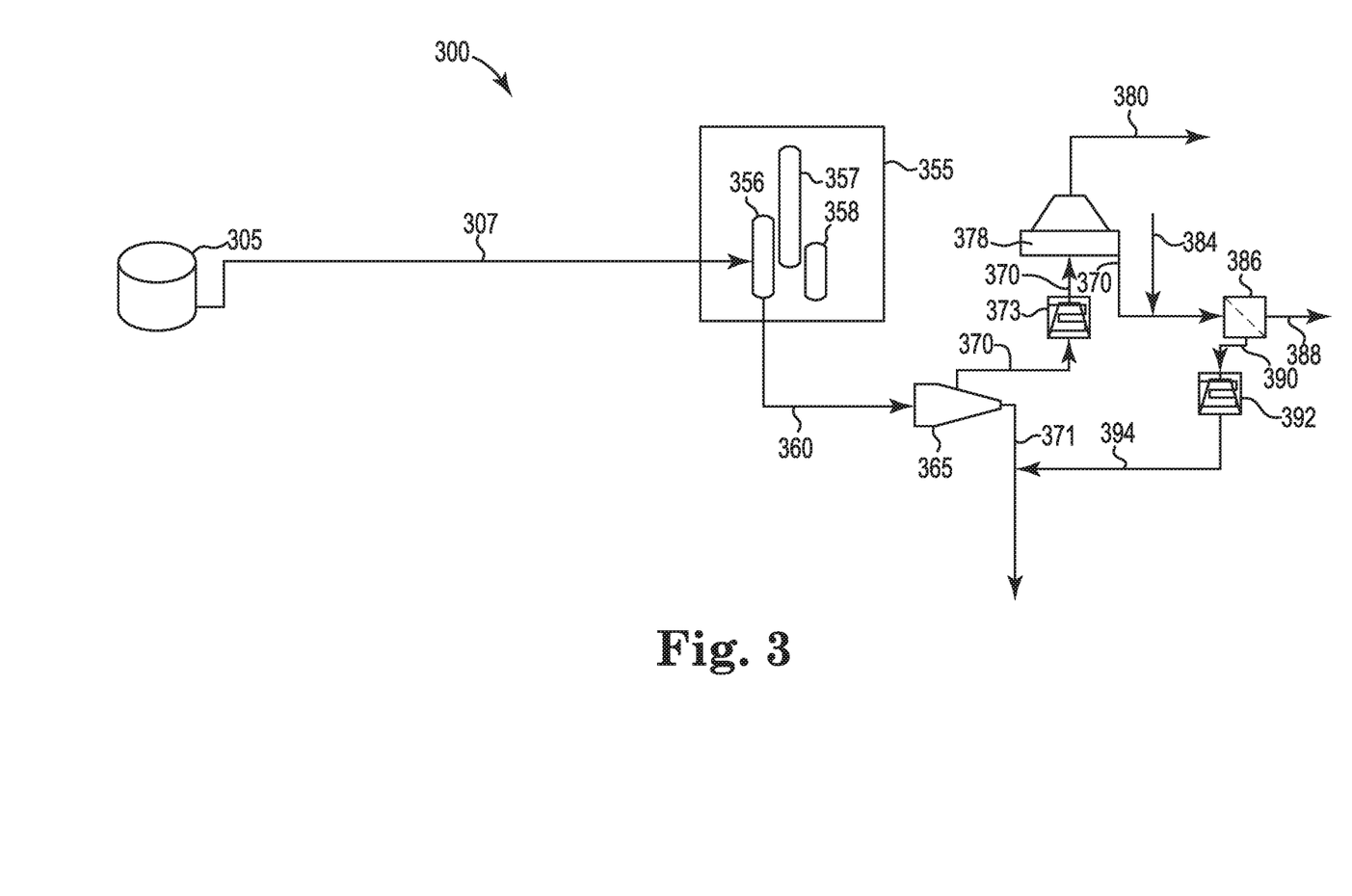
FIG. 3 is a schematic process diagram that illustrates removing one or more inorganic nutrients from a fermentation beer to form an aqueous fertilizer composition according to another embodiment of the present disclosure.
Figure 4:
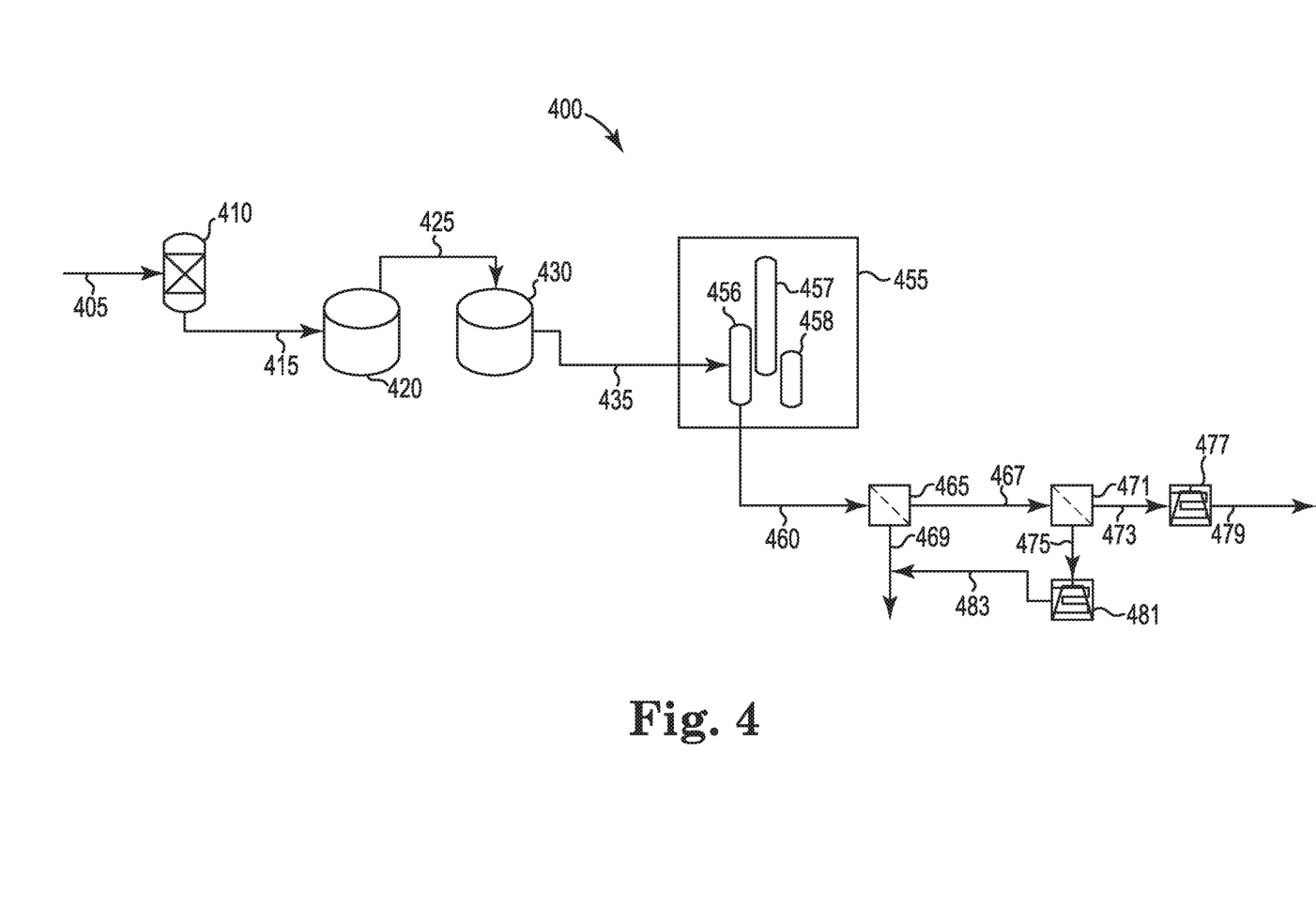
FIG. 4 is a schematic process diagram that illustrates removing one or more inorganic nutrients from a fermentation beer to form an aqueous fertilizer composition according to another embodiment of the present disclosure.
Figure 5:
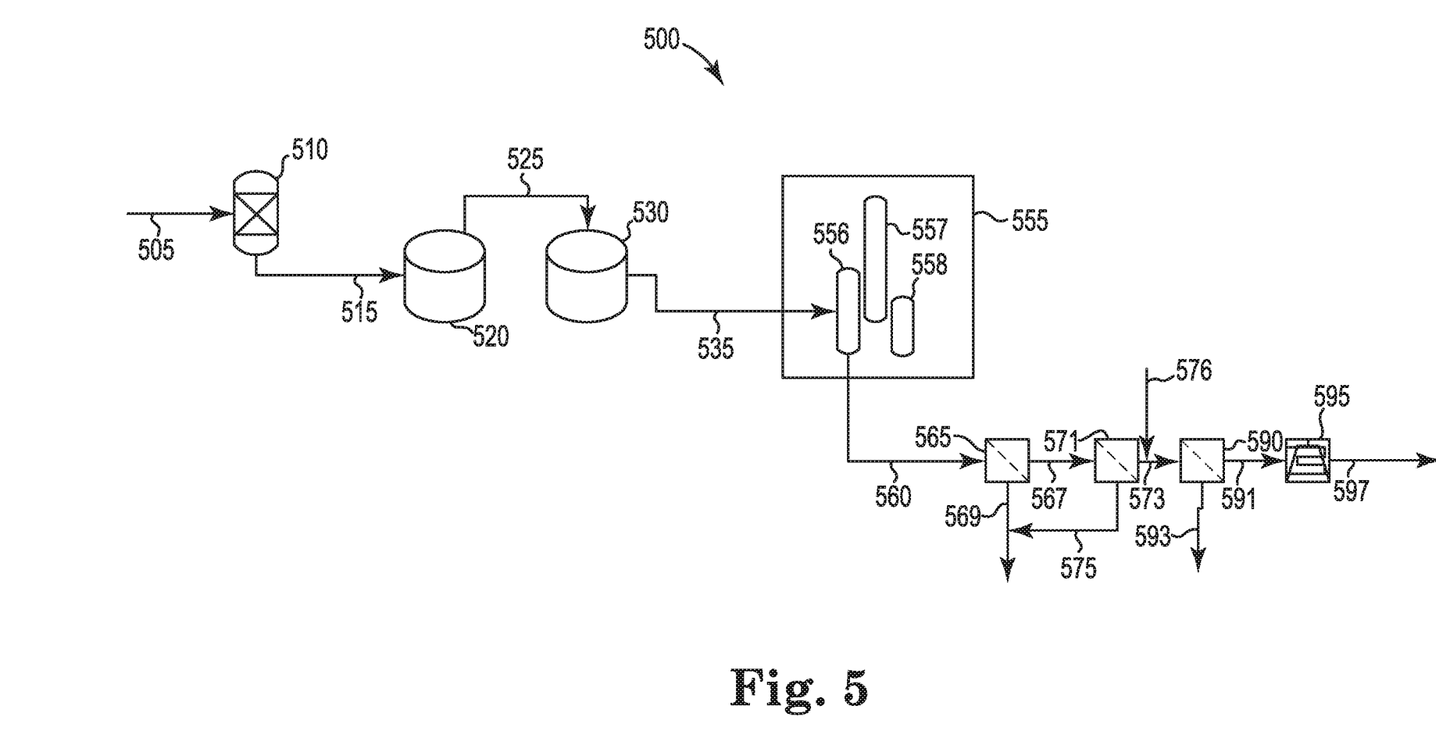
FIG. 5 is a schematic process diagram that illustrates removing one or more inorganic nutrients from a fermentation beer to form an aqueous fertilizer composition according to another embodiment of the present disclosure.
Figure 6:
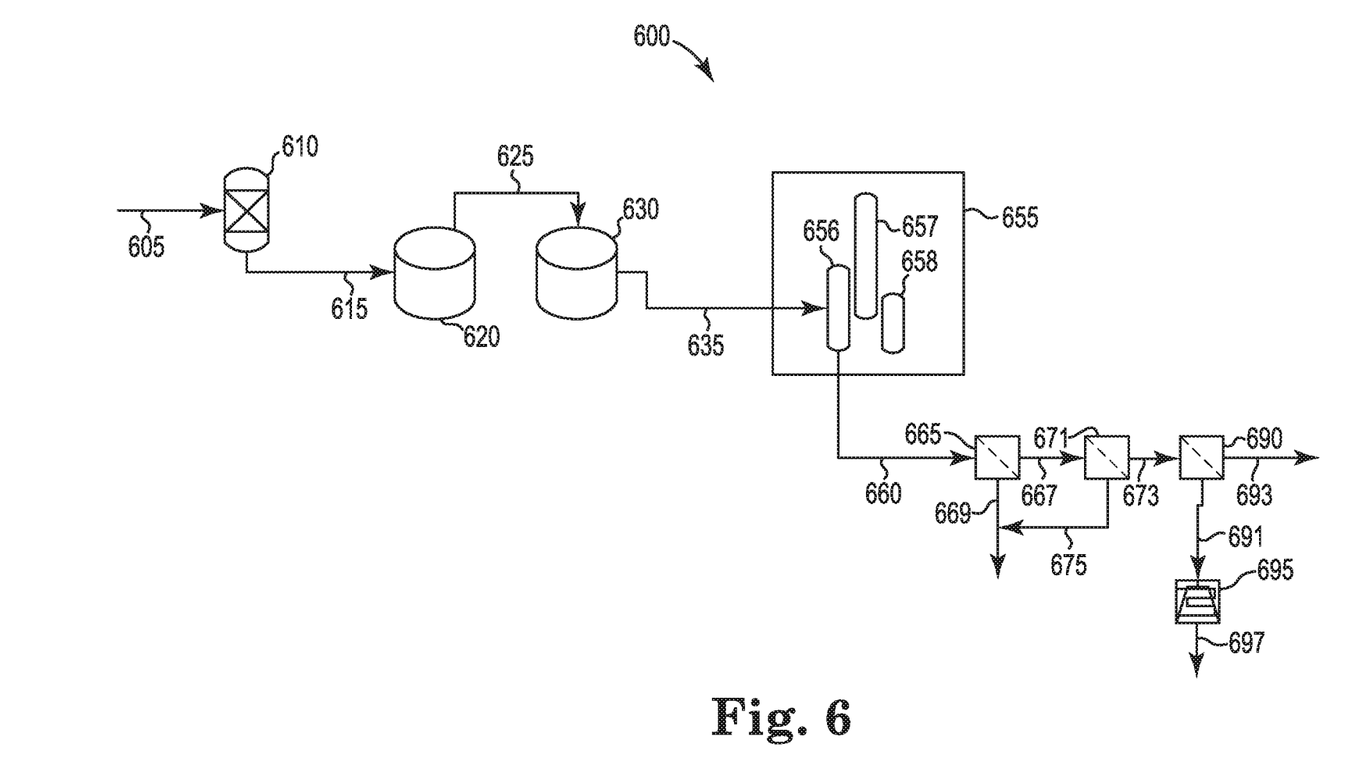
FIG. 6 is a schematic process diagram that illustrates removing one or more inorganic nutrients from a fermentation beer to form an aqueous fertilizer composition according to another embodiment of the present disclosure.

FIGS. 1-6 are discussed below and illustrate exemplary embodiments of the present disclosure. FIGS. 1-3 are in the context of corn grain ethanol production and FIGS. 4-6 are in the context of corn stover ethanol production.

FIG. 1 is a schematic process diagram that illustrates a system 100 for removing one or more inorganic nutrients from a fermentation beer to form an aqueous fertilizer composition according to one embodiment of the present disclosure. Although pretreatment is not shown in FIG. 1, system 100 can include providing pretreated biomass to fermenter 105. Pretreated biomass can be derived from dry grinding whole corn to provide whole ground corn (e.g., ground corn having an average particle size from below 500 micrometers up to 1 mm) and enzymatically saccharifying the whole ground corn to form the pretreated biomass.

Fermentor 105 can ferment pretreated biomass to form beer having an aqueous liquid component and a solid component. The beer can include residual solids, alcohol, oil, and inorganic nutrients. Stream 107 can deliver the beer to a centrifuge 110 that can separate at least a portion of the aqueous liquid component from the solid component to form an aqueous liquid stream 120 and washed solids 115. Liquid stream 120 can be delivered to centrifuge 125 where an oil fraction stream 130 and a yeast fraction stream 135 can be separated from the aqueous liquid stream 120. The aqueous liquid stream 120 can then be filtered using a membrane filter 140 to form a retentate 145 and a permeate 150. The permeate 150 includes ethanol, water, and the one or more inorganic nutrients. The retentate 145 includes enzymes, which can be recycled and reused or combined with dried distillers grains (DDG). The permeate 150 is delivered to distillation system 155. As shown, distillation system 155 includes beer stripper column 156, rectifier column 157, and side stripper column 158. As shown, permeate 150 is first distilled in a beer stripper column 156 to form a bottom stream 160 that includes a fertilizer composition including one or more inorganic nutrients extracted from biomass. Optionally, the bottom stream 160 can be evaporated to concentrate the fertilizer composition (e.g., to about 17% total solids).

FIG. 2 is a schematic process diagram that illustrates a system 200 for removing one or more inorganic nutrients from a fermentation beer to form an aqueous fertilizer composition according to another embodiment of the present disclosure. Although pretreatment is not shown in FIG. 2, system 200 can include providing pretreated biomass to fermenter 205. Pretreated biomass can be derived from dry grinding whole corn to provide whole ground corn (e.g., ground corn having an average particle size from below 500 micrometers up to 1 mm) and enzymatically saccharifying the whole ground corn to form the pretreated biomass. Fermentor 205 can ferment pretreated biomass to form beer having an aqueous liquid component and a solid component. The beer can include residual solids, alcohol, oil, and inorganic nutrients. Stream 207 can deliver the beer to a centrifuge 210 that can separate at least a portion of the aqueous liquid component from the solid component to form a first aqueous liquid stream 220 and a first slurry stream 215 that includes the solid component. Liquid stream 220 can be delivered to centrifuge 225 where an oil fraction stream 230 can be separated from the first aqueous liquid stream 220. After centrifugally separating the oil fraction stream 230 from the first aqueous liquid stream 220, the first slurry steam 215 and the first aqueous liquid stream 220 are combined to form a second slurry stream 235. The second slurry stream 235 is distilled in a distillation system 255. As shown, distillation system 255 includes beer stripper column 156, rectifier column 257, and side stripper column 258. As shown, second slurry stream 235 is first distilled in a beer stripper column 256 to form a bottom slurry stream 260 that includes the solid component, water, and the one or more inorganic nutrients. As shown, centrifuge 265 can centrifugally separate at least a portion of the water and one or more inorganic nutrients from the solid component to form a second aqueous liquid stream 270 and wet cake stream 271. The second aqueous liquid stream 270 can be filtered with a membrane filter 273 to form a retentate 277 and a permeate 275. The permeate 275 includes water and the one or more inorganic nutrients. The permeate 275 can be concentrated in an evaporator 279 by evaporating at least a portion of water from the permeate 275 to form a fertilizer composition 281. The retentate 277 includes spent yeast cells and can be evaporated in evaporator 283 to form a syrup 285 that is combined with wet cake stream 271.

FIG. 3 is a schematic process diagram that illustrates a system 300 for removing one or more inorganic nutrients from a fermentation beer to form an aqueous fertilizer composition according to another embodiment of the present disclosure. Although pretreatment is not shown in FIG. 3, system 300 can include providing pretreated biomass to fermenter 305. Pretreated biomass can be derived from dry grinding whole corn to provide whole ground corn (e.g., ground corn having an average particle size from below 500 micrometers up to 1 mm) and enzymatically saccharifying the whole ground corn to form the pretreated biomass. Fermentor 305 can ferment pretreated biomass to form beer having an aqueous liquid component and a solid component. The beer can include residual solids, alcohol, oil, and inorganic nutrients. The beer in stream 307 is distilled in a distillation system 355. As shown, distillation system 355 includes beer stripper column 356, rectifier column 357, and side stripper column 358. As shown, beer stream 307 is first distilled in a beer stripper column 356 to form a bottom slurry stream 360 that includes the solid component, water, and the one or more inorganic nutrients. As shown, centrifuge 365 can centrifugally separate at least a portion of the water and one or more inorganic nutrients from the solid component to form a first aqueous liquid stream 370 and wet cake stream 371. As shown, stream 370 can be concentrated in evaporator 373. After evaporator 373, an oil fraction stream 380 can be centrifugally separated from the first aqueous liquid stream 370 using centrifuge 378. As shown, distillate 384 from distillation system 355 can be added to first aqueous liquid stream 370 and the first aqueous liquid stream 370 can be filtered using a membrane filter 386 to form a retentate 390 and a permeate 388. The permeate 388 is a fertilizer composition according to the present disclosure. The retentate 390 can be evaporated in evaporator 392 to form a syrup 394 that is combined with wet cake stream 371.

FIG. 4 is a schematic process diagram that illustrates a system 400 for removing one or more inorganic nutrients from a fermentation beer to form an aqueous fertilizer composition according to another embodiment of the present disclosure. As shown, ground corn stover 405 (e.g., to less than 5 inches in length) is fed to a vessel 410 where sulfuric acid is mixed with water and ground corn stover to hydrolyze at least a portion of hemicellulose via an acid pretreatment. A slurry 415 is fed to saccharification vessel 420, where at least a portion of cellulose is enzymatically saccharified to provide pretreated biomass 425. Fermentor 430 can ferment the pretreated biomass 425 to form beer 435 having an aqueous liquid component and a solid component. The beer 435 can include residual solids (e.g., cellulose and lignin), alcohol, and inorganic nutrients. The beer 435 is distilled in a distillation system 455. As shown, distillation system 455 includes beer stripper column 456, rectifier column 457, and side stripper column 458. As shown, beer 435 is first distilled in a beer stripper column 456 to form a bottom slurry stream 460 that includes the solid component, water, and the one or more inorganic nutrients. As shown, filter press 465 can be used to mechanically press at least a portion of the water and one or more inorganic nutrients from the solid component in the slurry 460 to form a first aqueous liquid stream 467 and a lignin cake stream 469. Membrane filter 471 can be used to filter the first aqueous liquid stream 467 to form a retentate 475 and a permeate 473. The retentate 475 includes solids and molecules too large to pass through the membrane in membrane filter 471. The retentate 475 is concentrated in evaporator 481 to form stream 483 and combined with lignin cake stream 469. The permeate 473 is a fertilizer composition according to the present disclosure. As shown, the fertilizer composition 473 is heated in evaporator 477 to evaporate at least a portion of water from the aqueous fertilizer composition 473 to form a concentrated fertilizer composition 479 having a total solids content of about 17%.

FIG. 5 is a schematic process diagram that illustrates a system 500 for removing one or more inorganic nutrients from a fermentation beer to form an aqueous fertilizer composition according to another embodiment of the present disclosure. As shown, ground corn stover 505 (e.g., to less than 5 inches in length) is fed to a vessel 510 where sulfuric acid is mixed with water and ground corn stover to hydrolyze at least a portion of hemicellulose via an acid pretreatment. A slurry 515 is fed to sachharification vessel 520, where at least a portion of cellulose is enzymatically saccharified to provide pretreated biomass 525. Fermentor 530 can ferment the pretreated biomass 525 to form beer 535 having an aqueous liquid component and a solid component. The beer 535 can include residual solids (e.g., cellulose and lignin), alcohol, and inorganic nutrients. The beer 535 is distilled in a distillation system 555. As shown, distillation system 555 includes beer stripper column 556, rectifier column 557, and side stripper column 558. As shown, beer 535 is first distilled in a beer stripper column 556 to form a bottom slurry stream 560 that includes the solid component, water, and the one or more inorganic nutrients. As shown, filter press 565 can be used to mechanically press at least a portion of the water and one or more inorganic nutrients from the solid component in the slurry 560 to form a first aqueous liquid stream 567 and a lignin cake stream 569. Membrane filter 571 can be used to filter the first aqueous liquid stream 567 to form a retentate 575 and a permeate 573. As shown, the retentate 575 includes solids and molecules too large to pass through the membrane in membrane filter 571. The retentate 575 is combined with lignin cake stream 569. Ash 576 is added to permeate 573 to help supplement the content of one or more potassium and phosphorus. After adding ash 576, the permeate 573 is filtered using solid/liquid separation apparatus 590 to remove at least a portion of ash solids from the permeate 573 to form a retentate waste stream 593 and form a permeate 591 that is fertilizer composition that may include nutrients such as nitrogen, phosphorus, and potassium. In some embodiments, permeate 591 may also include sodium. As shown, the fertilizer composition 573 is heated in evaporator 595 to evaporate at least a portion of water from the aqueous fertilizer composition 591 to form a concentrated fertilizer composition 597 having a total solids content of about 17%.

FIG. 6 is a schematic process diagram that illustrates a system 600 for removing one or more inorganic nutrients from a fermentation beer to form an aqueous fertilizer composition according to another embodiment of the present disclosure. As shown, ground corn stover 605 (e.g., to less than 5 inches in length) is fed to a vessel 610 where sulfuric acid is mixed with water and ground corn stover to hydrolyze at least a portion of hemicellulose via an acid pretreatment. A slurry 615 is fed to saccharification vessel 620, where at least a portion of cellulose is enzymatically saccharified to provide pretreated biomass 525. Fermentor 630 can ferment the pretreated biomass 625 to form beer 635 having an aqueous liquid component and a solid component. The beer 635 can include residual solids (e.g., cellulose and lignin), alcohol, and inorganic nutrients. The beer 635 is distilled in a distillation system 655. As shown, distillation system 655 includes beer stripper column 656, rectifier column 657, and side stripper column 658. As shown, beer 635 is first distilled in a beer stripper column 656 to form a bottom slurry stream 660 that includes the solid component, water, and the one or more inorganic nutrients. As shown, filter press 665 can be used to mechanically press at least a portion of the water and one or more inorganic nutrients from the solid component in the slurry 660 to form a first aqueous liquid stream 667 and a lignin cake stream 669. Membrane filter 671 can be used to filter the first aqueous liquid stream 667 to form a retentate 675 and a permeate 673. As shown, the retentate 675 includes solids and molecules too large to pass through the membrane in membrane filter 671. The retentate 675 is combined with lignin cake stream 669. Although not shown, ash can be added to permeate 673 to help supplement the content of one or more potassium and phosphorus. As shown, the permeate 673 is filtered using solid/liquid separation apparatus 690 to form a retentate 691 that is fertilizer composition that may include nutrients such as nitrogen, phosphorus, and potassium. The solid/liquid separation apparatus 690 can be sized to remove at least a portion (e.g., substantially all) of any sodium from permeate 673 and form waste stream 693. Solid/liquid separation apparatus may use reverse osmosis and/or a membrane filter. As shown, the fertilizer composition 691 is heated in evaporator 695 to evaporate at least a portion of water from the aqueous fertilizer composition 691 to form a concentrated fertilizer composition 697 having a total solids content of about 17%. The fertilizer composition 697 can have "low" or no sodium content so that fertilizer composition 697 can be used as a "start-up" fertilizer. In some embodiments, solid/liquid separation apparatus 690 may remove at least a portion of phosphorous from permeate 673 along with sodium in permeate waste stream 693. If desired, a desired amount of phosphorous can be added back into streams 691 and/or 697.

What is claimed is:

1. A method of making a fertilizer composition from pretreated biomass, the method comprising:
    a) fermenting the pretreated biomass to provide a fermentation beer, wherein the pretreated biomass is derived from a biomass feedstock comprising a grain, and wherein the fermentation beer comprises a solid component and an aqueous liquid component;
    b) exposing the fermentation beer to a distillation process to form a whole stillage,
    c) separating the whole stillage into wet cake and thin stillage;
    d) passing after step c) the thin stillage through a membrane filter to form a permeate and a retentate, wherein the retentate comprises insoluble solids and the permeate comprises one or more inorganic nutrients in solution, and wherein the permeate forms the fertilizer composition.

2. The method of claim 1, wherein at least a portion of the fertilizer composition is heated to evaporate at least a portion of water from the fertilizer composition to form a concentrated liquid, fertilizer composition.

3. The method of claim 1, wherein water is removed from the retentate to form a concentrated retentate, and wherein the concentrated retentate is combined with the wet cake.

4. The method of claim 1, further comprising:
    a) prior to exposing the fermentation beer to a distillation process, separating at least a portion of the aqueous liquid component from the fermentation beer to form an aqueous liquid stream and a remainder of the fermentation beer;
    b) separating an oil fraction from the first liquid aqueous stream;
    c) after step (b), combining the first liquid aqueous stream with the remainder of the fermentation beer, and
    d) exposing the fermentation beer formed in step (c) to the distillation process to form the whole stillage.

5. The method of claim 1, wherein passing the thin stillage through the membrane filter comprises:
    a) separating an oil fraction from the thin stillage; and
    b) after step (a), passing the thin stillage through the membrane filter to form the permeate and the retentate.

6. The method of claim 1, wherein the pretreated biomass is derived from:
    dry grinding whole corn to provide whole ground corn;
    enzymatically saccharifying the whole ground corn to form the pretreated biomass.

7. The method of claim 1, wherein the one or more inorganic nutrients in solution comprise one or more inorganic elements endogenous to the biomass.

8. The method of claim 7, wherein the endogenous inorganic elements are selected from the group consisting of nitrogen, phosphorous, potassium, calcium, magnesium, sulfur, and combinations thereof.

9. A method of making a fertilizer composition from pretreated biomass, the method comprising:
    a) fermenting the pretreated biomass to provide a fermentation beer, wherein the pretreated biomass is derived from a biomass feedstock comprising corn stover, wherein the fermentation beer comprises a solid component and an aqueous liquid component;
    b) exposing the fermentation beer to a distillation process to form a bottom slurry comprising the solid component, water, and the one or more inorganic nutrients in solution;
    c) separating at least a portion of the water and one or more inorganic nutrients in solution from at least a portion of solid component in the slurry to form an aqueous liquid stream and a lignin cake stream; and
    d) passing the aqueous liquid stream through a membrane filter to form a permeate and a retentate, wherein the retentate comprises insoluble solids and the permeate comprises one or more inorganic nutrients in solution, and wherein the permeate forms the fertilizer composition.

10. The method of claim 9,
    wherein the separating step comprises mechanically pressing at least a portion of the water and the one or more inorganic nutrients in solution from the solid component in the slurry to form the aqueous liquid stream;
    and
    further comprising filtering the permeate to remove sodium from the permeate.

11. The method of claim 10, further comprising:
    adding ash to the permeate; and
    filtering at least a portion of ash solids from the permeate.

12. The method of claim 10, wherein the pretreated biomass is derived from:

mixing sulfuric acid with water and ground corn stover to hydrolyze at least a portion of hemicellulase; and enzymatically saccharifying at least a portion of cellulose to provide the pretreated biomass.

13. The method of claim 10, further comprising heating the permeate to evaporate at least a portion of water from the fertilizer composition to form a concentrated, liquid, aqueous fertilizer composition.

14. The method of claim 9, wherein water is removed from the retentate to form a concentrated retentate, and wherein the concentrated retentate is combined with the lignin cake stream.

* * * * *